United States Patent Office

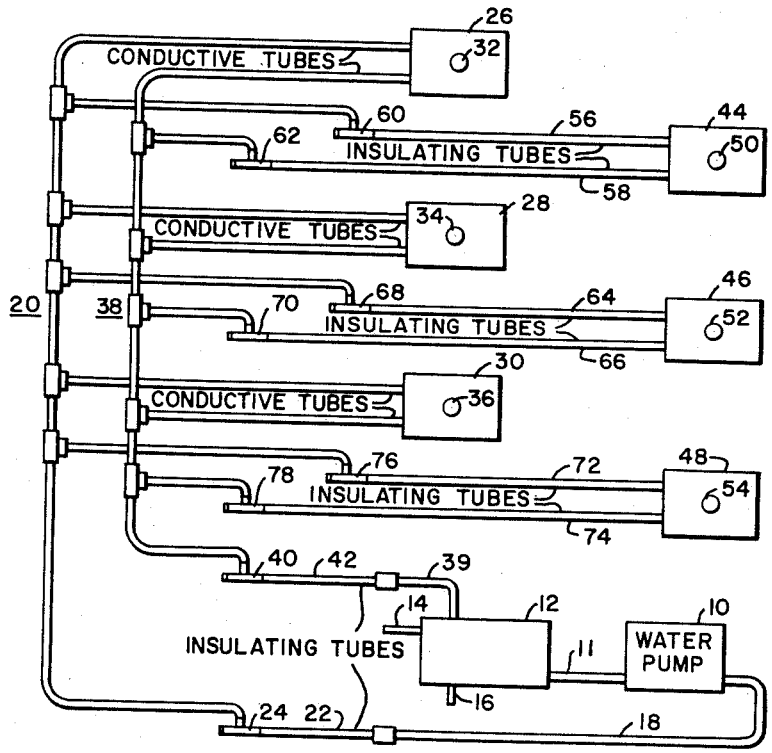
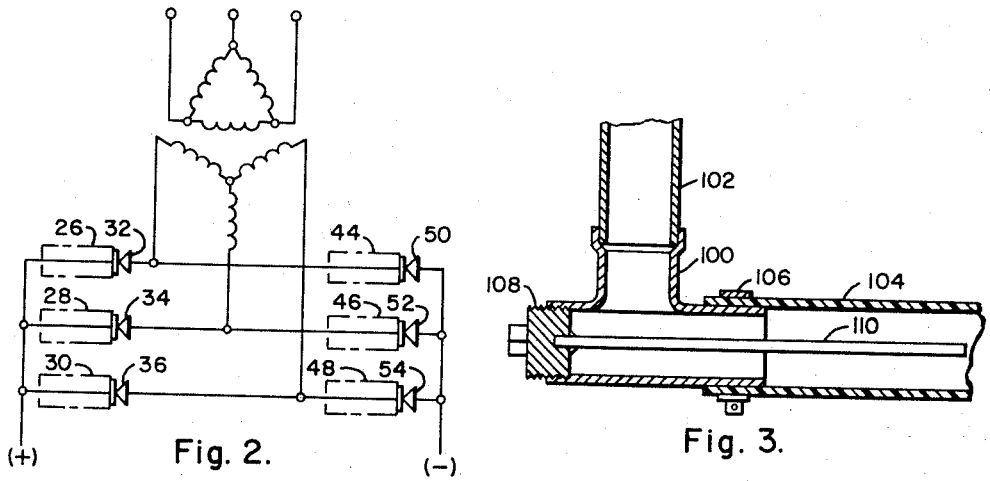

3,136,924
Patented June 9, 1964

3,136,924
COOLANT DISTRIBUTION SYSTEM HAVING AN ELECTROLYSIS TARGET, AN ELECTRICAL INSULATING TUBE AND HEAT SINKS AT DIFFERENT POTENTIALS
Henry M. Futral, Murrysville, and Charles W. Burkhart, North Huntingdon Township, Westmoreland County, Pa., assignors to Westinghouse Electric Corporation, East Pittsburgh, Pa., a corporation of Pennsylvania
Filed Aug. 18, 1961, Ser. No. 132,370
5 Claims. (Cl. 317—100)

This invention relates, in general, to cooling of semiconductor devices and more particularly to a piping system for cooling bridge rectifier systems.

To effectively meet the present day requirements for high power rectifiers some method of cooling the rectifying cells is necessary. The conventional method is to mount a rectifier diode on a heat sink and cool the heat sink by passing a coolant fluid through it. Due to a voltage difference between the coolant feed and return piping and the heat sink an electrolytic disposition takes place which of course tends to destroy the piping. To prevent destruction of the piping, a device known in the art as an electrolysis target is inserted in the coolant flow stream in such a manner that the target is attacked rather than the piping. Because of the large number of targets required in the prior art piping schemes, maintenance costs of the rectifier apparatus are high.

Accordingly, it is a general object of this invention to provide a new and improved piping system for cooling rectifier systems.

It is a more particular object of this invention to provide a new and improved piping system for cooling rectifier systems which requires a greatly reduced number of electrolysis targets.

Briefly, the present invention accomplishes the above cited objects by connecting the feed and return piping, which is normally at zero potential, so that it is at the positive direct current potential of the rectifier output. Since erosion takes place only from a positive potential to a negative potential one-half as many targets are required between the feed and return piping and the heat sinks, which have alternating current potential applied to them, as were required by the prior art piping system with the feed and return piping at zero potential. That is, when the feed and return piping is at zero potential erosion occurs from the feed and return piping to the heat sinks during the negative half-cycle of the alternating current applied to the heat sink, and from the heat sink to the feed and return piping during the positive half-cycle. To protect the heat sinks and the feed and return piping a target is required at each end of the insulating tubing between the heat sink and feed and return piping. When the feed and return piping is at the positive direct current potential of the rectifier, they are of course always positive with respect to the heat sinks and thereby a target is required only at the feed and return piping end of the insulating tubing between the feed and return piping and the heat sinks.

Further objects and advantages of the present invention will become apparent as the following description proceeds and features of novelty which characterize the invention will be pointed out in particularity in the claims annexed to and forming a part of the specification.

For a better understanding of the invention, reference may be had to the accompanying drawing, in which:

FIGURE 1 shows a piping schematic of a cooling distribution system for a rectifier system;

FIG. 2 is a schematic diagram of a bridge rectifier used with the piping schematic of FIG. 1; and FIG. 3 is an enlarged sectional view of an electrolysis target.

Referring to FIG. 1, a pump 10 is shown connected to a reservoir 12 through piping means 11. The pump 10 circulates coolant water from the reservoir 12 through the rest of the system. The reservoir 12 has input piping 14 and output piping 16 for supply water and discharge water, respectively, in the case of an open system.

The section of feed pipe 18 connects the pump 10 to the input pipe or header 20 through an insulating tube 22, such as rubber, and an electrolysis target 24. The target is necessary because the input header 20 is at the positive direct current potential of the rectifier and the pump 10 is of course at ground potential. As stated before, in the absence of the electrolysis target 24, the piping header 20 would be eroded away due to a positive to ground potential difference between the header 20 and the pump 10. The insulating tube 22 is necessary to electrically isolate the heat sinks 26, 28 and 30, which are at the positive direct current potential of the rectifier from the pump 10 which is at a different potential.

The header or feed piping 20 is at the positive direct current potential because it is connected directly to the heat sinks 26, 28 and 30 which have the cathodes of the rectifiers 32, 34 and 36, respectively, connected in electrical contact with them. The return piping or header 38, also connected in electrical contact with the heat sinks 26, 28 and 30, is at the positive direct current potential of the rectifier output. Therefore, a target 40 and an insulating tube 42 is required to connect the return piping header 38 through the section of return pipe 39, to the reservoir 12 which like the pump 10 is at ground potential.

The heat sinks 44, 46 and 48 have the cathodes of the rectifiers 50, 52 and 54 in electrical connection with them. The heat sinks 44, 46 and 48 being substantially at a less positive potential than the feed header 20 and return header 38 must have an insulating pipe, to carry the coolant, and a target to prevent erosion, connected between the heat sinks 44, 46 and 48 and the headers 20 and 38. That is, heat sink 44 has an insulating tube 56 and an electrolysis target 60 connected between it and the feed header 20. An insulating tube 58 and an electrolysis target 62 connects the heat sink 44 to the return header 38. Similarly, heat sink 46 has insulating tubes 64 and 66 and electrolysis targets 68 and 70 connecting it to feed header 20 and return header 38, respectively. Heat sink 48 has insulating tubes 72 and 74 and targets 76 and 78 connecting it to feed header 20 and return header 38, respectively.

FIG. 2 is a schematic diagram of a bridge rectifier circuit used with the cooling system described with like parts having the same reference characters as FIG. 1.

FIG. 3 is a section view of an electrolysis target as used in this invention. The main body of the target is a pipe T 100. The pipe T 100 has metallic piping 102 connected at one opening and an insulating tube 104 such as rubber hose connected at a second opening. The insulating tube 104 is connected to the pipe T or body 100 by a hose clamp 106 or any other suitable means. The metallic piping 102 is attached to the body 100 by soldering, brazing, threading or any other appropriate means. A pipe plug 108 is attached to the third opening of the pipe T or body 100 in some manner, such as screw threads, which will allow easy removal. The pipe plug 108 has a metallic rod 110 of an electrical conductive material such as copper or steel welded to the inside of the plug 108 so that the rod extends through the body of the T 100 into the insulating tube 104.

The target body 100 is electrically connected, by the metallic pipe 102, to a positive direct current potential and the insulating tube 104 connected to a less positive direct current potential whereby the described electrolytic decomposition process will cause the metal rod 110 to be eroded away. Of course the erosion takes place from the point at a positive direct current potential that is the shortest distance from a point at a less positive direct current potential. Therefore, the rod 110 is eroded away rather than the connecting metallic tubing.

While there has been shown and described what is at present considerd to be the preferred embodiment of the invention, modifications thereto will readily occur to those skilled in the art. It is not desired, therefore, that the invention be limited to the specific arrangement shown and described and it is intended to cover in the appended claims all such modifications as fall within the true spirit and scope of the invention.

We claim as our invention:

1. A coolant distribution system comprising, a feed pipe, a return pipe, a first heat sink normally at a first electrical potential, a second heat sink normally at a potential lower than said first heat sink, means electrically connecting said feed pipe and said return pipe to said first heat sink, and means connecting said feed pipe and said return pipe through an electrical insulating tube and a target to said second heat sink.

2. A coolant distribution system comprising, a pump, a reservoir, piping means connecting said pump with said reservoir, a feed pipe, a return pipe, first and second heat sinks, said first heat sink being normally at a first potential, said second heat sink being normally at a potential less than said first potential, means electrically connecting said feed pipe and said return pipe to said first heat sink, means connecting said feed pipe and said return pipe to said second heat sink through an insulating tube and an electrolysis target, means connecting said feed pipe to said pump through an insulating tube and an electrolysis target, and means connecting said return pipe to said reservoir through another insulating tube and an electrolysis target.

3. A coolant distribution system comprising, a pump, a reservoir, piping means connecting said pump with said reservoir, a first and a second section of feed pipe having an insulating tube and an electrolysis target therebetween, a first and a second section of return pipe having an insulating tube and an electrolysis target therebetween, first and second heat sinks, said first heat sink being normally at a first potential, said second heat sink being normally at a potential less than said first potential, means electrically connecting said first section of feed pipe and said first section of return pipe to said first heat sink, means connecting said first section of feed pipe and said first section of return pipe to said second heat sink through an insulating tube and an electrolysis target, means connecting said second section of feed pipe to said pump, and means connecting said second section of return pipe to said reservoir.

4. A coolant distribution system comprising, a pump, a reservoir, piping means connecting said pump with said reservoir, a first and a second section of feed pipe, a first and a second section of return pipe, first and second heat sinks, said first heat sink being normally at a first potential, said second heat sink being normally at a potential less than said first potential, means electrically connecting said first section of feed pipe and said first section of return pipe to said first heat sink, means connecting said first section of feed pipe and said first section of return pipe to said second heat sink through insulating tubes each having an electrolysis target at one end thereof, means connecting said second section of feed pipe to said first section of feed pipe through an insulating tube and an electrolysis target, and means connecting said second section of return pipe to said first section of feed pipe through another insulating tube and an electrolysis target.

5. A coolant distribution system comprising, a first and a second section of feed pipe, a first and second section of return pipe, a first plurality and a second plurality of heat sinks, a reservoir, a pump, piping means connecting said pump with said reservoir, said pump circulating the coolant from said reservoir through said distribution system, said first plurality of heat sinks normally at a first potential, said second plurality of heat sinks normally at a potential less than said first potential, means connecting said first section of feed pipe to said first plurality of heat sinks, means connecting said first section of return pipe to said first plurality of heat sinks thereby providing a coolant flow path through said first heat sinks, insulating means connecting said first section of feed pipe and said first section of return pipe through a target to said second plurality of heat sinks thereby providing a coolant flow path through said plurality of second heat sinks, insulating means connecting said second section of feed pipe to said first section of feed pipe through a target, insulating means connecting said second section of return pipe to said first section of return pipe through a target, said second section of feed pipe connected to said pump, and said second section of return pipe connected to said reservoir.

References Cited in the file of this patent

UNITED STATES PATENTS 2,869,003     Marsh et al.     Jan. 13, 1959
2,917,685     Wiegand     Dec. 15, 1959